(12) United States Patent
Ono

(10) Patent No.: US 12,296,767 B2
(45) Date of Patent: May 13, 2025

(54) AUTOMOTIVE STRUCTURAL MEMBER

(71) Applicant: NIPPON STEEL CORPORATION, Tokyo (JP)

(72) Inventor: Atsushi Ono, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 297 days.

(21) Appl. No.: 17/802,356

(22) PCT Filed: Jun. 8, 2021

(86) PCT No.: PCT/JP2021/021740
§ 371 (c)(1),
(2) Date: Aug. 25, 2022

(87) PCT Pub. No.: WO2022/009589
PCT Pub. Date: Jan. 13, 2022

(65) Prior Publication Data
US 2023/0087083 A1 Mar. 23, 2023

(30) Foreign Application Priority Data
Jul. 8, 2020 (JP) .................................. 2020-117662

(51) Int. Cl.
*B60R 19/18* (2006.01)
*B60R 19/04* (2006.01)

(52) U.S. Cl.
CPC .............. *B60R 19/18* (2013.01); *B60R 19/04* (2013.01); *B60R 2019/1806* (2013.01)

(58) Field of Classification Search
CPC . B60R 19/18; B60R 19/1806; B60R 19/1866; B60R 2019/1806;
(Continued)

(56) References Cited

U.S. PATENT DOCUMENTS 3,997,207 A * 12/1976 Norlin ..................... B60R 19/18
267/140
4,726,166 A * 2/1988 DeRees ................ B62D 25/025
52/696

(Continued)

FOREIGN PATENT DOCUMENTS

JP 2003-220909 A 8/2003
JP 2015-147437 A 8/2015
(Continued)

*Primary Examiner* — Gregory A Blankenship
(74) *Attorney, Agent, or Firm* — Birch, Stewart, Kolasch & Birch, LLP

(57) ABSTRACT

A first member (110) of an automotive structural member (1) has a flange portion (111), a first member ridgeline portion (112) connected to the flange portion (111), a protruding portion (113) having a top surface (113a) which is connected to, the first member ridgeline portion (112) and is aligned with a top surface (111a) of the flange portion (111) at the same level (L), and a recessed portion (114) adjacent to the protruding portion (113). A second member (120) has a second member ridgeline portion (121) having an upper surface (121a) in contact with a lower surface (112b) along the lower surface (112b) of the first member ridgeline portion (112), a vertical wall (122) connected to the second, member ridgeline portion (121), and a bottom wall (123) connected to the vertical wall (122). A stiffening member (200) supports the recessed portion (114).

9 Claims, 9 Drawing Sheets

(58) Field of Classification Search
CPC .... B60R 2019/1866; B60R 2019/1813; B60R 2019/182; B62D 25/025
See application file for complete search history.

(56) References Cited

U.S. PATENT DOCUMENTS

| | | | | |
|---|---|---|---|---|
| 5,219,197 A * | 6/1993 | Rich | ....................... | B60R 19/18 |
| | | | | 293/121 |
| 6,371,540 B1 * | 4/2002 | Campanella | ............ | B60R 19/18 |
| | | | | 293/121 |
| 7,163,242 B2 * | 1/2007 | Shuler | ..................... | B60R 19/18 |
| | | | | 293/121 |
| 7,278,667 B2 * | 10/2007 | Mohapatra | .............. | B60R 19/18 |
| | | | | 293/132 |
| 10,994,681 B2 * | 5/2021 | Koga | ........................ | B60R 19/04 |
| 2011/0101714 A1 * | 5/2011 | Bator | ....................... | F16F 7/121 |
| | | | | 29/428 |
| 2013/0140854 A1 * | 6/2013 | Mori | .................... | B62D 25/025 |
| | | | | 296/209 |
| 2016/0144812 A1 * | 5/2016 | Kaneko | ................... | B60R 19/22 |
| | | | | 293/102 |
| 2017/0080980 A1 * | 3/2017 | Alwan | ...................... | B60K 1/04 |
| 2017/0136971 A1 * | 5/2017 | Suzumori | ............... | B60R 19/18 |
| 2019/0263342 A1 * | 8/2019 | Rodgers | .................. | B60R 19/18 |
| 2020/0164819 A1 * | 5/2020 | Koga | ...................... | B60R 19/03 |
| 2021/0039718 A1 | 2/2021 | Koga et al. | | |
| 2021/0339801 A1 * | 11/2021 | Urushibata | .......... | B62D 25/025 |
| 2022/0041219 A1 * | 2/2022 | Son | ....................... | B62D 21/157 |
| 2023/0271649 A1 * | 8/2023 | Suzuki | ................. | B62D 25/025 |
| | | | | 280/784 |
| 2024/0059238 A1 * | 2/2024 | Ono | ....................... | B60R 19/18 |

FOREIGN PATENT DOCUMENTS

| | | |
|---|---|---|
| JP | 2017-88058 A | 5/2017 |
| JP | 6485606 B1 | 3/2019 |
| JP | 6566174 B1 | 8/2019 |
| WO | WO2019/035185 A1 | 2/2019 |
| WO | WO2020/085385 A1 | 4/2020 |

* cited by examiner

AUTOMOTIVE STRUCTURAL MEMBER

TECHNICAL FIELD

The present invention relates to an automotive structural member.

Priority is claimed on Japanese Patent Application No. 2020-117662, filed Jul. 8, 2020 the content of which is incorporated herein by reference.

BACKGROUND ART

Conventionally, there are automotive structural members that can absorb impact energy from a lateral side.

However, there is room for improvement for conventional automotive structural members in absorbing a large amount of impact energy with a small amount of penetration.

CITATION LIST

Patent Document

Patent Document 1
Japanese Patent Publication No. 6566174
Patent Document 2
Japanese Patent Publication No. 6485606
Patent Document 3
Japanese Unexamined Patent Application, First Publication No. 2017-088058

SUMMARY OF THE INVENTION

Problems to be Solved by the Invention

In view of the above-mentioned problems of the background art, it is an object of the present invention to provide an automotive structural member that can absorb a large amount of impact energy with a small amount of penetration.

Means for Solving the Problem

The gist of the present invention is as follows.

(1) An automotive structural member according to one aspect of the present invention is an elongated and hollow automotive structural member including a portion extending along a linear axis, which includes: a first member extending in the axial direction of the automotive structural member; a second member that extends in the axial direction and is connected to the first, member to form a closed cross-section together with the first member; and a stiffening, member disposed between the first member and the second member, wherein the first member includes a flange portion, a first member ridgeline portion connected to the flange portion, a protruding portion including a top surface that is connected to the first member ridgeline portion and aligned with a top surface of the flange portion at the same level, and a recessed portion adjacent to the protruding portion, the second member includes a second member ridgeline: portion that has an upper surface in contact with a lower surface of the first, member ridgeline portion along the lower surface, a vertical wall connected to the second member ridgeline portion, and a bottom wall connected to the vertical wall, and the stiffening member supports the recessed portion.

(2) In the above (1), the stiffening member may be connected to or disposed close to the bottom wall.

(3) In the above (1) or (2), the stiffening member may be disposed along the axis and disposed at a position deviated from a center of the recessed portion toward the axis side.

(4) In any of the above (1) to (3), the stiffening member may have a wave shape along the axis.

(5) In any of the above (1) to (4), the stiffening member may have notch portions formed intermittently along the axis.

(6) In any of the above (1) to (5), the stiffening member may include a first stiffening member and a second stiffening member in parallel, and may be connected to the bottom wall via a plate-shaped base member that fixes the first stiffening member and the second stiffening member.

(7) In the above (6), the first stiffening member and the second stiffening member may be separated from each other at a central portion in the axial direction.

(8) In the above (6) or (7), the first stiffening member and the second stiffening member may be joined in a state in which they are in contact with each other at end portions thereof in the axial direction.

(9) In any of the above (1) to (8), the second member may be attached to a vehicle body.

Effects of the Invention

According to the present invention, it is possible to provide an automotive structural member that can absorb a large amount of impact energy with a small amount of penetration.

EMBODIMENT(S) FOR IMPLEMENTING THE INVENTION

Embodiments

Figure 1:
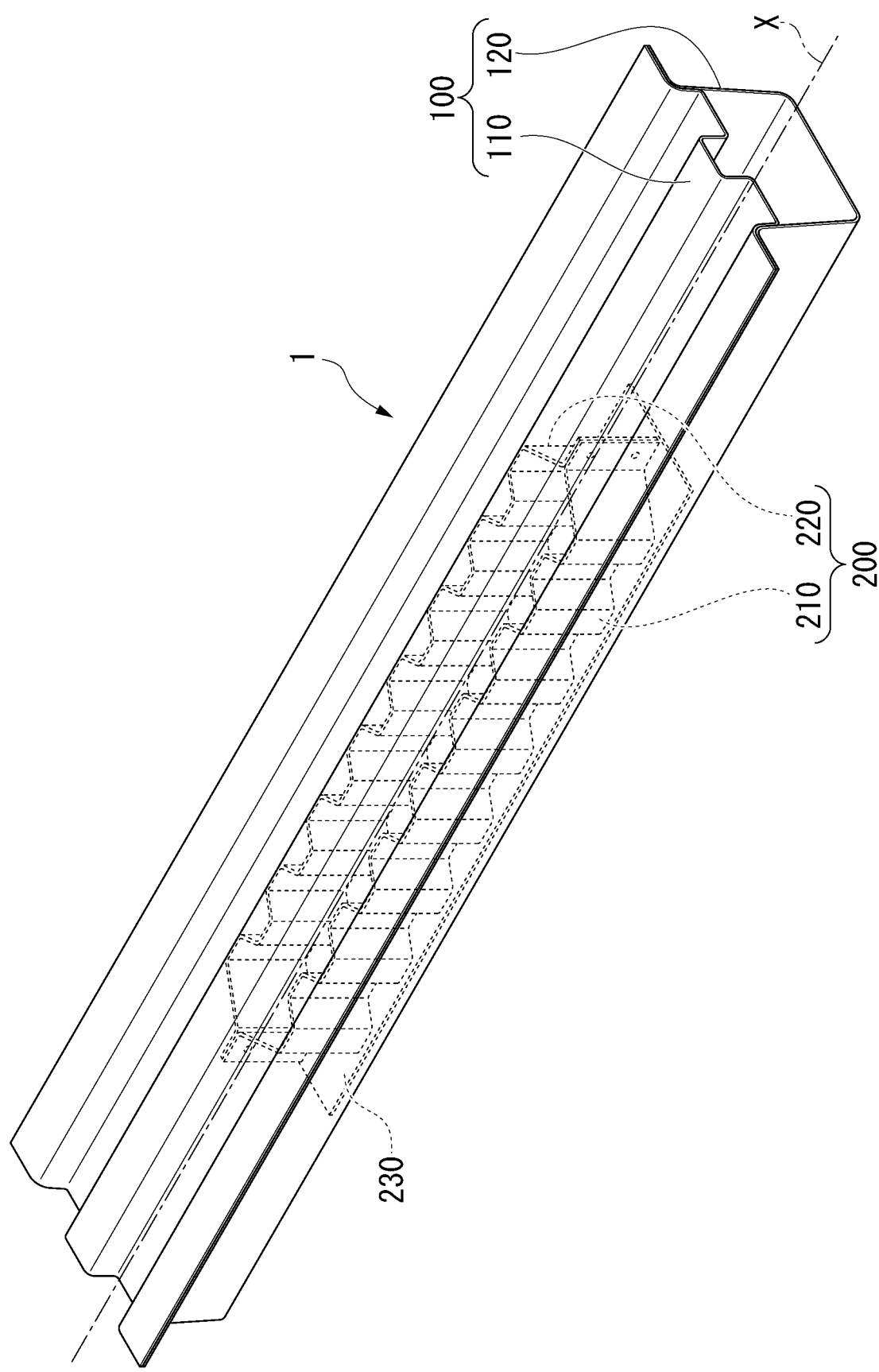
FIG. 1 is a perspective view of an automotive structural member.
Figure 2:
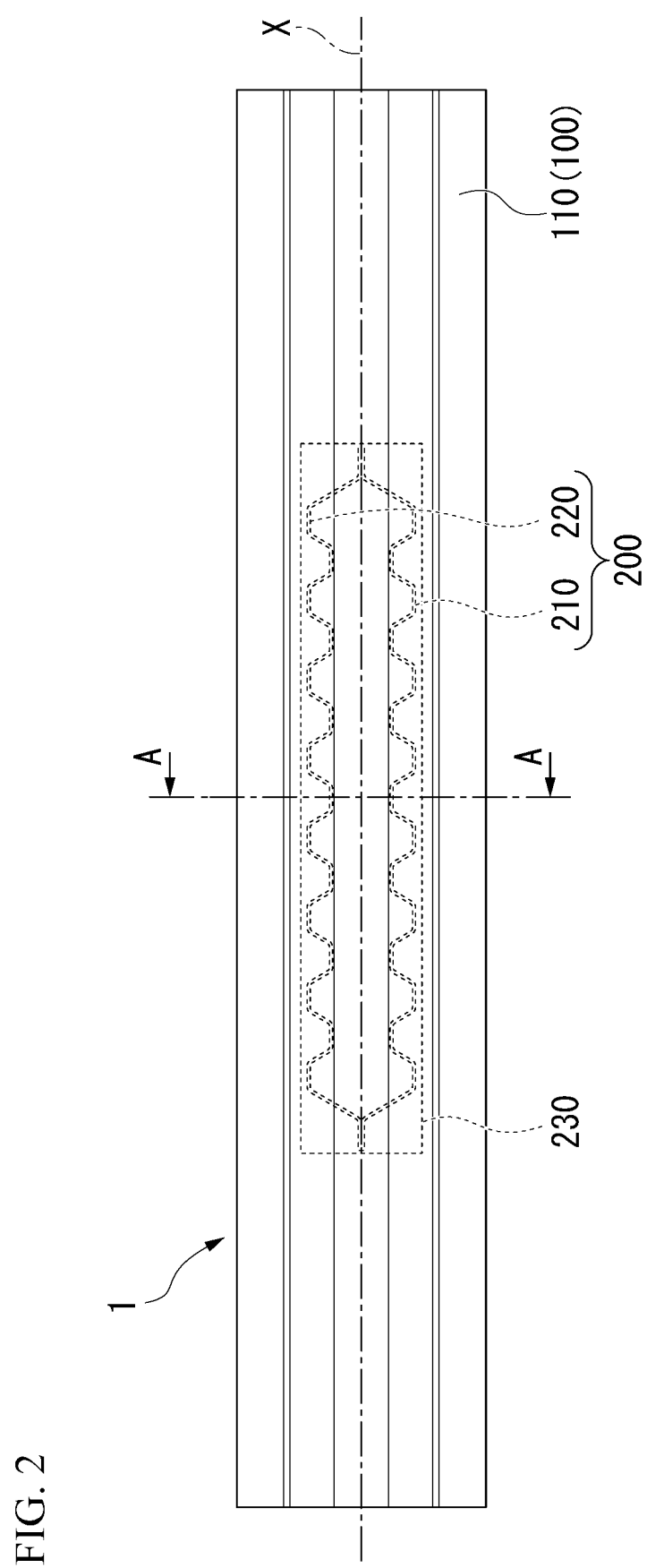
FIG. 2 is a plan view of the automotive structural member.
Figure 3:
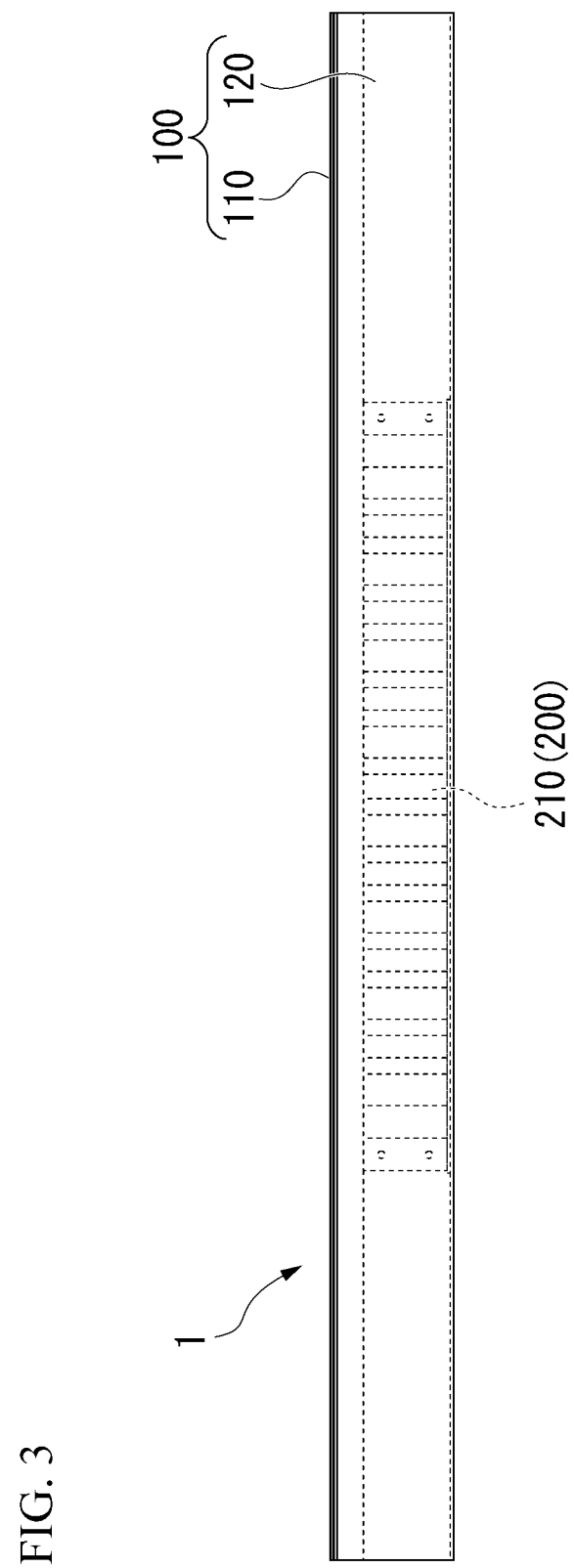
FIG. 3 is a front view of the automotive structural member.
Figure 4:
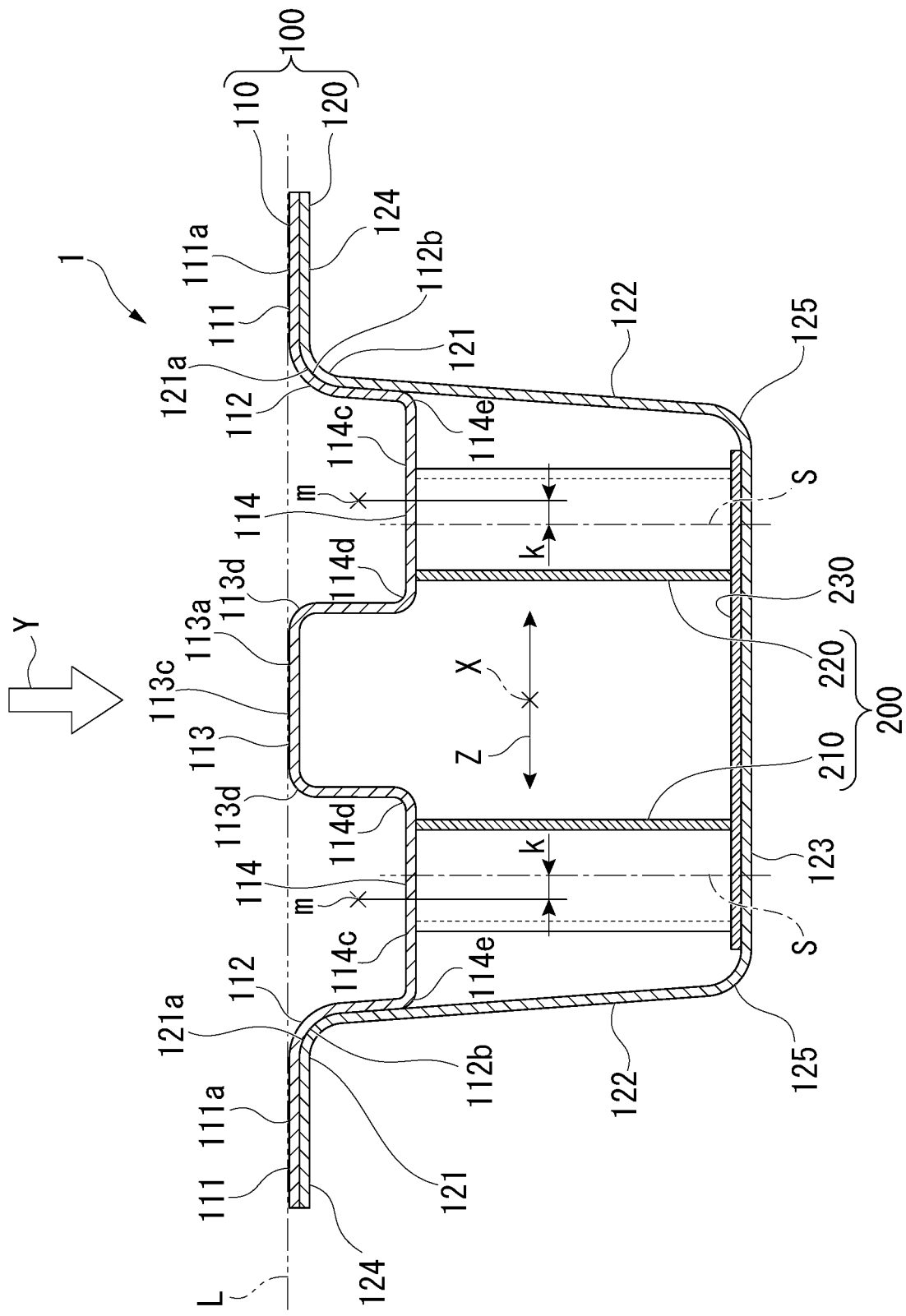
FIG. 4 is a diagram seen along arrow A in FIG. 2.

FIG. 1 is a perspective view of an automotive structural member 1. FIG. 2 is a plan view of the automotive structural member 1. FIG. 3 is a front view of the automotive structural member 1. FIG. 4 is a diagram seen along arrow Ain FIG.

2. Also, FIGS. 1 to 3 show a state in which a stiffening member 200 disposed between a first member 110 and, a second member 120 is seen through. In addition, hereinafter, assuming a case in which the automotive structural member 1 is applied to, a vehicle body, a lateral direction in FIG. 24 may be referred to as a height direction Z, a vertical direction in FIG. 4 may be referred to as a collision direction Y or a front to rear direction, and a direction perpendicular to the paper surface in FIG. 4 may be referred to as an axis X direction or a width direction. In this case, a side on which an obstacle in the collision direction Y first collides (an upper side in FIG. 4) may be referred to as forward, and a side opposite thereto (a lower side in FIG. 4) may be referred to as rearward.

The automotive structural member 1 according to the present embodiment can be applied as, for example, a bumper beam attached to a front-end portion or a rear end portion of a vehicle body. When attached to the front-end portion, the automotive structural member 1 according to the present embodiment is usually attached to the vehicle body, with the axis X aligned in the width direction (a lateral direction) of the vehicle body, in a posture in which the first member 110 is disposed forward in the vehicle body and the second member 120 is disposed rearward in the vehicle body. In that case, the second member 120 is attached to the vehicle body.

As shown in FIGS. 1 to 3, the automotive structural member 1 according to the present embodiment has an elongated and hollow shape including a portion extending along the linear axis X. Specifically, the automotive structural member 1 includes the first member 110 extending in the axis X direction and the second member 120 that extends in the axis X direction and is connected to the first member 110 to form a closed cross-section together with the first member 110. Thus, high bending rigidity against bending around an axis orthogonal to the axis X is ensured.

Here, the linear axis X is not limited to a geometrically exact straight line and also includes a slightly curved line, for example, an arcuate curve.

Also, a part of the automotive structural member 1 in a longitudinal direction thereof may be disposed along the linear axis X. For example, a certain range of a central portion thereof in the longitudinal direction is disposed along the linear axis X. For example, as in a case in which the automotive structural member 1 is applied to a center pillar, one end portion, or both end portions of the automotive structural member 1 in the longitudinal direction may be a curved portion along a curved axis (not shown) that is not disposed along the linear axis X, or may be configured to have an asymmetric cross-section in the height direction Z.

In addition, the axis X may coincide with a member axis (an axis in the longitudinal direction, which passes through a centroid of a cross-section of a member) of the automotive structural member 1 or a member excluding the stiffening member 200, which is configured of the first member 110 and the second member 120.

Further, the automotive structural member 1 includes the stiffening member 200 disposed between the first member 110 and the second member 120. Thus, when a load such as an impact force is applied to the automotive structural member 1, the stiffening member 200 resists deformation such as crush of the cross-section formed by the first member 110 and the second member 120 in a direction in which the load acts, and thus even if an impact force that acts thereon is large, decrease in second moment of area of the automotive structural member 1 can be inhibited. Accordingly, high bending rigidity of the automotive structural member 1 over a wide range of an applied load is ensured.

As shown in FIG. 4, the cross-section of the automotive structural member 1 may have a symmetrical shape in the height direction Z with a virtual surface serving as a center, which passes through the axis X and lies along the collision direction Y.

Also, the cross-section of the automotive structural member 1 (or the member excluding the stiffening member 200, which is configured of the first member 110 and the second member 120) may have a uniform shape in the axis X direction, but is not limited thereto. It may be a cross-section that gradually and continuously changes along the axis X direction within a range in which the maximum dimension (a cross-sectional height) of the cross-section of the automotive structural member 1 in the collision direction Y, which is a crushing direction, does not change suddenly. For example, in order to balance the mass and rigidity of the automotive structural member 1 in consideration of an applied position of an external force, support conditions, and the like, depending on use, the cross-section of the automotive structural member 1 may be formed to have the largest shape (an area, a first moment of area, or a second moment of area) in the central portion in the longitudinal direction, or may be formed to have a relatively small shape as it approaches an end portion thereof in the longitudinal direction.

(First Member)

The first member 110 is made of steel, for example.

Specifically, as shown in FIG. 4, the first member 110 has first member flange portions 111 (a flange portion), first member, ridge line portions 112 connected to the first member flange portions 111, a protruding portion 113 having a top surface 113*a* that is connected to the first member ridgeline portions 112 and is aligned with top surfaces 111*a* of the first member flange portions 111 at the same level L (a reference surface), and recessed portions 114 adjacent to the protruding portion 113. Here, the top surface 113*a* does not have to completely coincide with the top surfaces 111*a* at the same level L as long as the first member ridgeline portions 112, second member ridgeline portions 121, and the stiffening member 200, which overlap each other, cooperate with each other to share the applied load and resist deformation of the cross-section so that reduction in an amount of penetration of the automotive structural member 1 and improvement in an amount of absorption of impact energy can be achieved at the same time. That is, the top surface 113*a* being aligned, with the top surfaces 111*a* at the same level L is not limited to the top surface 113*a* completely coinciding with the reference surface serving as the level L, and also includes the top surface 113*a* deviating from the reference surface serving as the level L by, for example, about ⅕ of a height of the protruding portion 113.

The first member flange portions 111 are formed at both end portions of the first member 110 in the height direction Z (lateral direction in FIG. 4). The first member flange portions 111 extend in the height direction Z, and the top surfaces 111*a* are disposed along the level L.

The first member ridgeline portions 112 bend from the first member flange portions 111 along the level L rearward in the collision direction Y, which is a substantially vertical direction. The first member ridgeline portions 112 are in contact with and overlap the second member ridgeline portions 121. Thus, the first member ridgeline portions 112 and the second member ridgeline portions 121 restrain each, other not to cause deformations and behave as one, thereby increasing rigidity, and thus deformation of the second member ridgeline portions 121 of the second member 120 when a load is applied to the first member 110 of the automotive structural member 1 is inhibited.

The protruding portion 113 has a top portion 113c disposed in the height direction Z on the forefront side in the collision direction Y. Also, the protruding portion 113 has protruding portion curved portions 113d that are formed to be disposed along the collision direction Y from tips, which bend rearward in the collision direction Y from both end portions of the top portion 113c in the height direction Z, and are connected to the recessed portions 114. In addition, a cross-section of the protruding portion 113 is formed into substantially a U shape in which the top portion 113c and the protruding portion curved portions 113d located on both sides thereof are connected to each other to protrude forward in the collision direction Y.

The top surface 113a of the protruding portion 113 and the top surfaces 111a of the first member flange portions 111 are aligned with each other at the same level L, and thus a timing of receiving a load from an obstacle colliding with the first member 110 of the automotive structural member 1 can be simultaneously set at the protruding portion 113 and the first member flange portions 111. In addition, the load can be distributed and received by the protruding portion 113 and the first member flange portions 111.

Also, FIG. 4 shows an example in which the automotive structural member 1 has a single protruding portion 113, but the present invention is not limited thereto. The automotive structural member 1 may have a plurality of protruding portions 113. In that case each protruding portion 113 may have the recessed portions 114 on both sides in the height direction Z. Further, in that case, the top surface 113a of each of the plurality of protruding portions 113 and the top surfaces 111a of the first member flange portions 111 may be aligned with each other at the same level L.

Each of the recessed portions 114 has a bottom portion 114c disposed along the height direction Z on the rearward side thereof in the collision direction Y. Further, each of the recessed portions 114 has a first recessed portion curved portion 114d that is formed to be disposed along collision direction Y from a tip, which bends forward in the collision direction Y from one end portion of the bottom portion 114c in the height direction Z, and is connected to the protruding portion 113, and a second recessed, portion curved portion 114e that is formed to be disposed along the collision direction Y from a tip, which bends forward in the collision direction Y from the other end portion of the bottom portion 114c in the height direction Z, and is connected to the first member ridgeline portion 112.

In addition, a cross-section of the recessed portion 114 is formed in substantially a U shape in which the first recessed portion curved portion 114d, the bottom portion 114c, and the second recessed portion curved portion 114e are connected to each other to protrude rearward in the collision direction Y.

Here, at least the first member ridgeline portion 112 and a portion from the first member ridgeline portion 112 to the second recessed portion curved portion 114e of the first member 110 are in a state in which they overlap at least the second member ridgeline portion 121 and a part of a vertical wall 122 of the second member 120 and are preferably in contact with each other. Thus, when a load such as an impact acts on the first member ridgeline portion 112 and the second member ridgeline portion 121 from the front side to the rear side in the collision direction Y, they overlap each other in contact with each other and thus restrain their deformation each other to behave as one, thereby increasing the rigidity. Accordingly, buckling in the first member ridgeline portion 112 and the second member ridgeline portion 121 is inhibited. In addition, simultaneously with this effect, due to the portion from the first member ridgeline portion 112 to the second recessed portion curved portion 114e, and the vertical wall 122, which overlap each other in contact with each other, thus restrain their deformation each other to behave as one, and have the increased rigidity, deformation of the vertical wall 122 to narrow toward a side closer to the axis X (inner side) can be inhibited even in a large load, range.

(Second Member)

The second member 120 is made of steel, for example.

The second member 120 has the second member ridgeline portions 121 that are disposed along lower surfaces 112b of the first member ridgeline portions 112 and have upper surfaces 121a in contact with the lower surfaces 112b, the vertical walls 122 connected to the second, member ridgeline portions 121, and a bottom wall 123 connected to the vertical walls 122. The second member 120 appropriately has second member flange portions 124 connected to the second member ridgeline portions 121. As described above, the second member ridgeline portion 121 has the upper surface 121a along the lower surface 112b of the first member ridgeline portion 112 and in contact with the lower surface 112b. Thus, the first member ridgeline portion 112 and the second member ridgeline portion 121 overlap each other, behave as one, and thus have an increased rigidity. Accordingly, the maximum load capacity can be increased.

Specifically, the second member ridgeline portion 121 bends rearward in the collision direction Y which is a substantially vertical direction, from the second member flange portion 124 extending substantially parallel to the level L. The second member ridgeline portion 121 is in contact with and overlaps the first member ridgeline portion 112. Thus, since the first member ridgeline portion 112 and the second member ridgeline portion 121 overlap each other, behave as one, and have an increased rigidity, buckling of the second member 120 at the second member ridgeline portion 121 when a load is applied to the first member 110 of the automotive structural member 1 can be inhibited. Accordingly, load-bearing performance of the automotive structural member 1 can be improved.

Further, as compared with a case in which there is a gap between the first member ridgeline portion 112 and the second member ridgeline portion 121, occurrence of a sudden cross-sectional deformation such that parts of the first member ridgeline portion 112 and the second member ridgeline portion 121 in the longitudinal direction are bent, and subsequently the vertical wall 122 bulges in the height direction Z to cause an out-of-plane deformation can be prevented. In addition, due to a synergistic effect of the effect of improving the rigidity of the ridgeline portions and the effect of, inhibiting the deformation of the vertical wall 122 due to the stiffening member 200, the automotive structural member 1 can show a cross-sectional deformation while bearing a high load. Accordingly, the automotive structural member 1 which can absorb a large amount of impact energy with a small amount of penetration can be obtained.

The vertical wall 122 is disposed in a posture in which both surfaces in a plate thickness direction constituting the vertical wall 122 are aligned along a direction of a load acting on the automotive structural member 1 (collision direction Y), which is orthogonal to the axis X. Also, the vertical wall 122 may be slightly inclined with respect to the collision direction Y to the extent that buckling strength is not significantly impaired. A rear end portion of the vertical wall 122 in the collision direction Y is connected to the bottom wall 123 via a corner portion 125. A front-end portion of the vertical wall 122 in the collision direction Y is connected to the second member flange portion 124 via the second member ridgeline portion 121.

The bottom wall 123 extends substantially parallel to the level L. Both, end portions of the bottom wall 123 in the height direction Z are connected to the vertical wall 122 via the corner portions 125.

The second member flange portion 124 is in contact with and overlaps the first member flange portion 111 and joined to each other by means such as welding. Thus, the rigidity against a load acting along the collision direction Y is increased.

(Stiffening Member)

Figure 5:
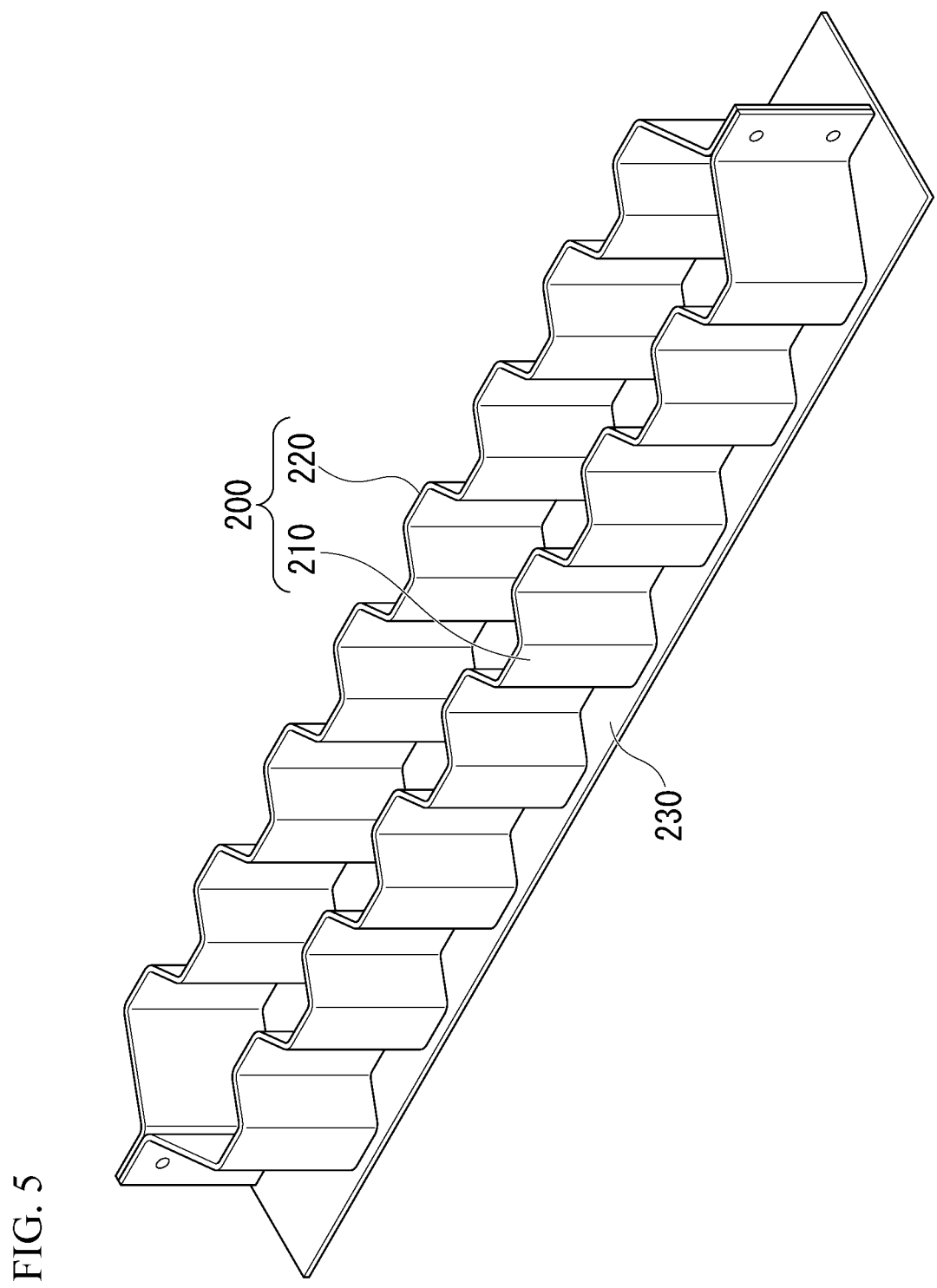
FIG. 5 is a perspective view of a stiffening member.

FIG. 5 is a perspective view of the stiffening member 200. In FIG. 5, the first member 110 and the second member 120 are not shown.

The stiffening member 200 is disposed along the axis X of the automotive structural member 1.

As shown in FIG. 4, the stiffening member 200 is disposed between the first member 110 and the second member 120. As shown in FIG. 4, the stiffening member 200 is disposed to be symmetrical in the height direction Z with a virtual surface, which passes through the axis X and is disposed along the collision direction Y, serving as a center.

The stiffening member 200 may have a plate shape, for example. The stiffening member 200 may be made of a metal such as, for example, steel, aluminum, or an aluminum alloy, or may be made of a resin. An in-plane direction of a plate surface of the stiffening member 200 is preferably disposed along the collision direction Y. Thus, a compressive force in the collision direction Y can be applied to the stiffening member 200 in the plate surface direction to resist with a high buckling strength.

The stiffening member 200 supports the recessed portions 114 of the first member 110. The stiffening member 200 preferably supports the recessed portions 114 by being fixed to the recessed portions 114 by welding or the like. In this way, the stiffening member 200 increases rigidity of the recessed portions 114, and thus when a load such as an impact acts from the front side to the rear side in the collision direction Y, deformation of the recessed portions 114 that inhibit deformation of the vertical walls 122 toward the axis X is inhibited. Thus, even in a large load range, the recessed portions 114 can effectively inhibit deformation of the vertical walls 122 toward the axis X, that is, deformation in which a dimension in the height direction Z narrows. Accordingly, the automotive structural member 1 can absorb a large amount of impact energy with a small amount of penetration (the maximum dimension of deformation in the collision direction Y when an obstacle having a predetermined shape collides with the automotive structural member 1).

Also, the stiffening member 200 may straddle between the recessed portions 114 and the protruding portion 113 and support both.

The stiffening member 200 is connected to or placed close to the bottom wall 123. The stiffening member 200 is preferably connected to the bottom wall 123 by a plate-shaped base member 230 coming into contact therewith, which will be described later. Since the stiffening member 200 is connected to the bottom wall 123, a load acting on the protruding portion 113 of the first member 110 can b transmitted from the recessed portions 114 adjacent to the protruding portion 113 to the bottom wall 123 of the second member 120 via the stiffening member 200. In addition, at the same time, a load acting on the first member flange portions 111 can be transmitted from the first member ridgeline portions 112 adjacent to the first member flange portions 111 to the bottom wall 123 of the second member 120 via the vertical walls 122. That is, the stiffening member 200 supports the recessed portions 114 and is connected to the bottom wall 123, and thus the loads acting on the protruding portion 113 and the first member flange portions 111 can be received by the stiffening member 200 via the recessed portions 114, and the deformation of the vertical walls 122 can be inhibited. Accordingly, deformations of the first member 110 and the second member 120 can be inhibited even in a large load range.

The stiffening member 200 is disposed along the axis X, and as shown in FIG. 4, is disposed at a position deviated from centers m of the recessed portions 114 (centroidal axes of the recessed portions 114) toward the axis X by a deviating distance k. The deviating distance k may be a distance from the center m to a surface S that bisects the stiffening member 200 in the height direction Z. Thus, a relatively large deformation on the side closer to the axis X (inner side) from the centers of the recessed portions 114 in the recessed portions 114 due to the load transmitted from the protruding portion 113, which is assumed when there is no stiffening member 200 (see Comparative Example 3 in FIG. 8) can be inhibited more reliably. Accordingly, deformation of the automotive structural member 1 when a load is applied can be reasonably inhibited with the smallest possible mass.

The stiffening member 200 may have a wave shape along the axis X. That is, the stiffening member 200 may have a plate shape that is formed to undulate alternately between the side close to the axis X (inner side) and a side away from the axis X (outer side) in the height direction Z along the axis X.

The stiffening member 200 has first plane portions on the vertical walls 122 side along the axis X, first slope portions that are connected to the first plane portions and are inclined diagonally with respect to the axis X, second plane portions connected to the first slope portions on the axis X side along the axis X, and second slope portions that are connected to the second plane portions and are inclined diagonally toward a side opposite to the first slope portions with respect to the axis X. In addition, it has a shape in which one waveform formed by the first plane portions, the first slope portions, the second plane portions, and the second slope portions (hereinafter referred to as a "plane portion") is repeated plural times along the axis X.

In this way, the plurality of plane portions are continuous with each other, and two adjacent plane portions may have different postures in the axis X direction. Also, the plurality of plane portions may have different postures in the axis X direction in a state in which two adjacent plane portions are separated from each other.

Also, the waveform shape of the stiffening member 200 may be, for example, a sinusoidal curve.

Thus, since a buckling wavelength can be shortened and the buckling strength against the compressive force acting along the collision direction Y can be increased, buckling (crushing) can be made while maintaining a large load. Accordingly, a large amount of energy absorption can be secured.

The stiffening member 200 has a first stiffening member 210 and a second stiffening member 220 in parallel. The stiffening member 200 may be disposed along the vertical walls 122. Also, the stiffening member 200 may be configured of a plurality of members such as three or more members in parallel. In addition, the stiffening member 200 is connected to the bottom wall 123 of the second member 120 via the plate-shaped base member 230 that fixes the first stiffening member 210 and the second stiffening member 220. Thus, deformation of the stiffening member 200 due to crushing can be stabilized. Further, a clearance may be provided between the base member 230 and the bottom wall 123 as long as the deformation of the stiffening member 200 due to crushing is stable. In this case, the stiffening member 200 is disposed close to the bottom wall 123.

The first stiffening member 210 and the second stiffening member 220 are separated from each other at the central portion in the axis X direction. Thus, a load acting on the automotive structural member 1 along the collision direction Y can be distributed and received in the height direction Z by the two vertical walls 122 and the two stiffening members 200. Accordingly, deformation, that occurs locally in the height direction Z can be inhibited.

The first stiffening member 210 and the second stiffening member 220 are in contact with and joined to each other at end portions thereof in the axis X direction. Thus, the stiffening member 200 can be stably crushed.

As described above, the stiffening member 200 of the present embodiment supports the recessed portions 114 by being fixed to the recessed portions 114 by welding or the like, but it suffices that the stiffening member 200 supports the recessed portions 114 when the automotive structural member 1 receives a collision load. That is, as a modified example of a configuration in which the stiffening member 200 supports the recessed portions 114, a front-end portion of the stiffening member 200 in the collision direction Y may be disposed between the first member 110 and the second member 120 not to come into contact with the entire range of the axis X.

(Modified Example of Stiffening Member)

Next, a modified example of the stiffening member 200 will be described.

The stiffening member 200 preferably has a surface disposed along the collision direction Y. The surface disposed along the collision direction Y may be a flat surface or a curved surface, any of the first stiffening member 210 and the second stiffening member 220 described above is an example in which a plurality of planes disposed along the collision direction Y are disposed in different postures when viewed in the collision direction Y, and the same applies to the modified example described below. The surface disposed along the collision direction Y may be a curved surface. In this case, the stiffening member 200 can be configured by disposing, for example, a plurality of cylindrical members in a state in which axes of cylinders are in contact with or separated from each other in postures disposed along the collision direction Y.

Figure 6:
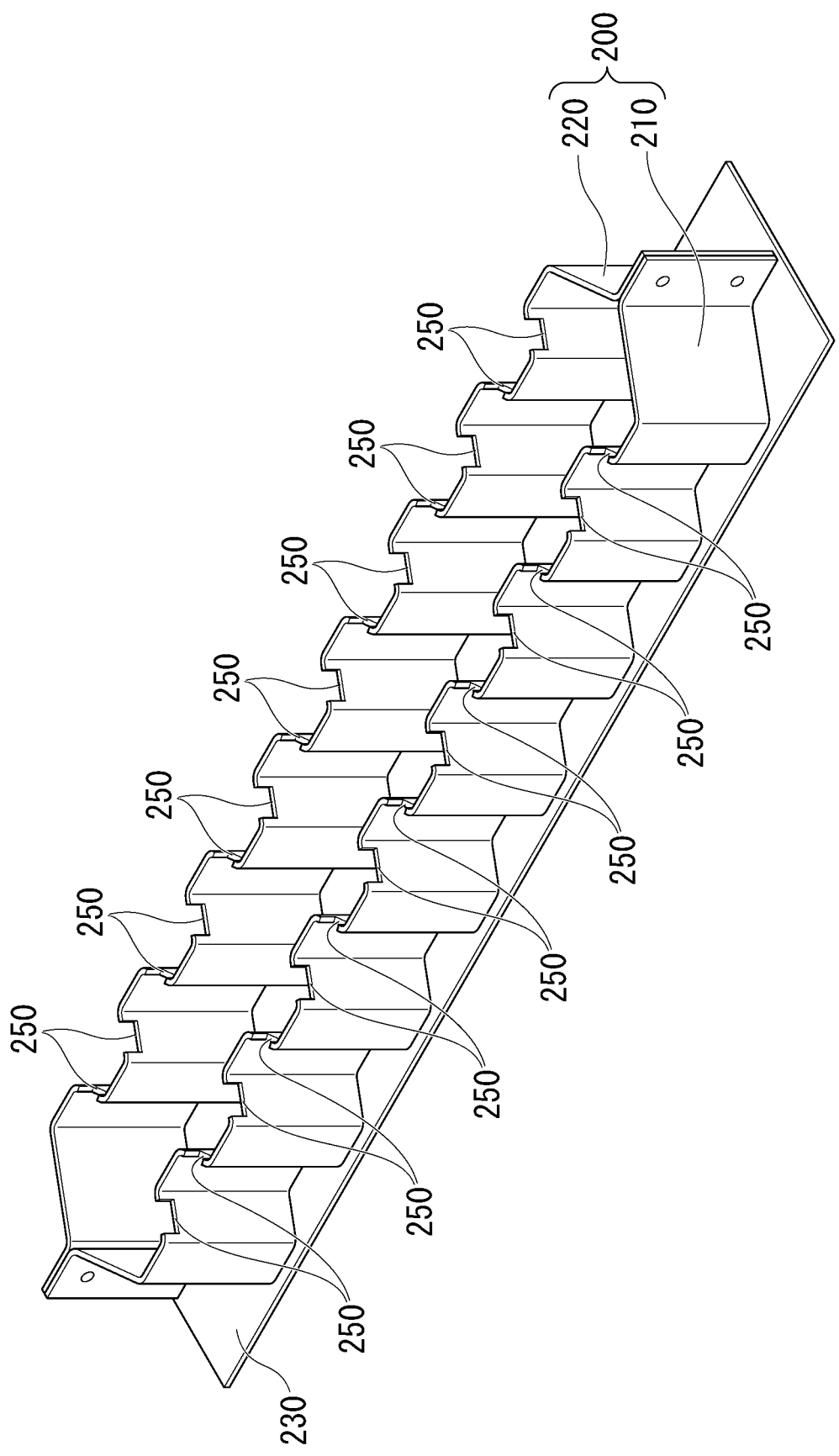
FIG. 6 is a perspective view according to a modified example of the stiffening member.

FIG. 6 is a perspective view according to a modified example of the stiffening member 200. FIG. 6 specifically shows the stiffening member 200 having, a plurality of planes disposed along the collision direction Y.

As shown in FIG. 6, the stiffening member 200 may have notch portions 250 formed intermittently along the axis X. The notch portions 250 are provided at the front-end portion of the stiffening member 200 in the collision direction Y.

Thus, it is possible to, reduce a reaction force (a peak load) received by the automotive structural member 1 when a load is applied from being excessive, and to stably promote crushing of the stiffening member 200 at an initial stage when the load starts to be applied. Accordingly, a large amount of energy absorption can be secured.

Effects

Next, Effects of the automotive structural member 1 according to the present embodiment will be described by comparing a cross-sectional deformation of the automotive structural member 1 according to the present embodiment with a cross-sectional deformation of comparative examples when a load is applied in the collision direction Y.

FIGS. 7 to 10 show results of collision analysis when a load is applied to the first member 110 (the protruding portion 113 and the first member flange portions 111 in Comparative Example 3 and the present embodiment) from the front side in the collision direction Y at the central portion of the automotive structural member 1 in the axis X direction in a state in which both end portions of the automotive structural member 1 in the axis X direction are simply supported from the rear side in the collision direction Y.

Figure 7:
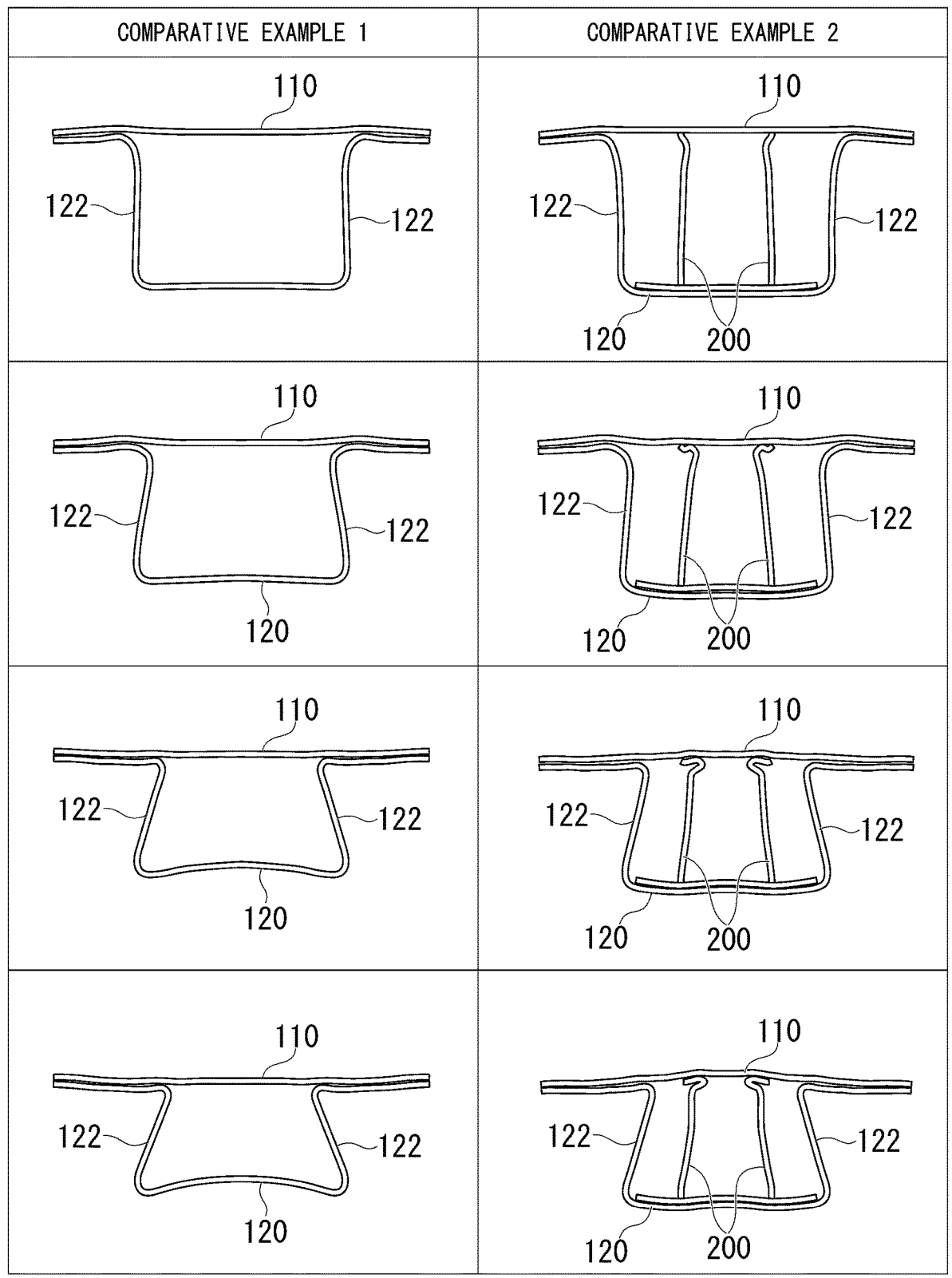
FIG. 7 is a comparative diagram showing cross-sectional deformations of Comparative Example 1 and Comparative Example 2.
Figure 8:
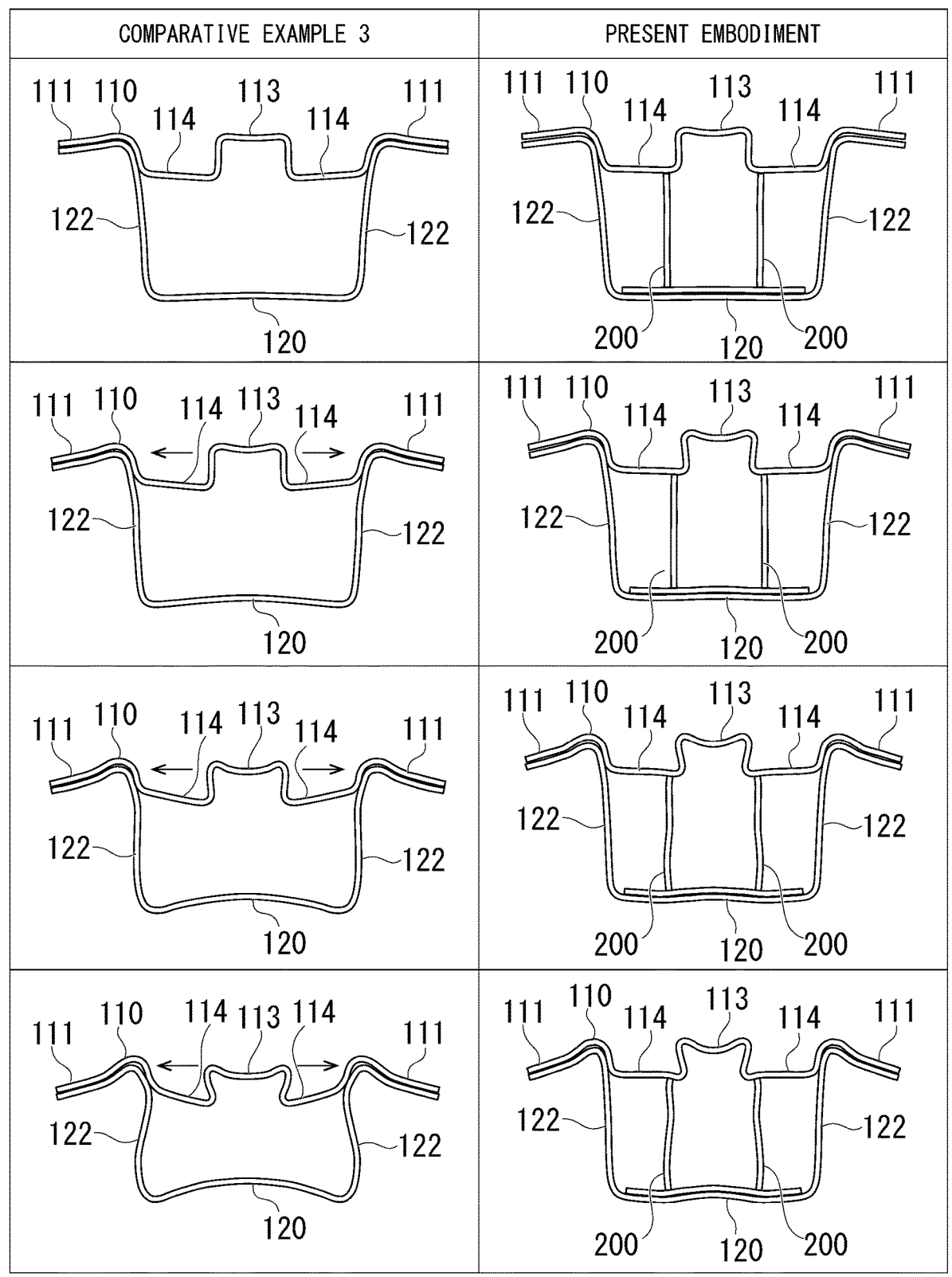
FIG. 8 is a comparative diagram showing cross-sectional deformations of the present embodiment and Comparative Example 3.
Figure 9:
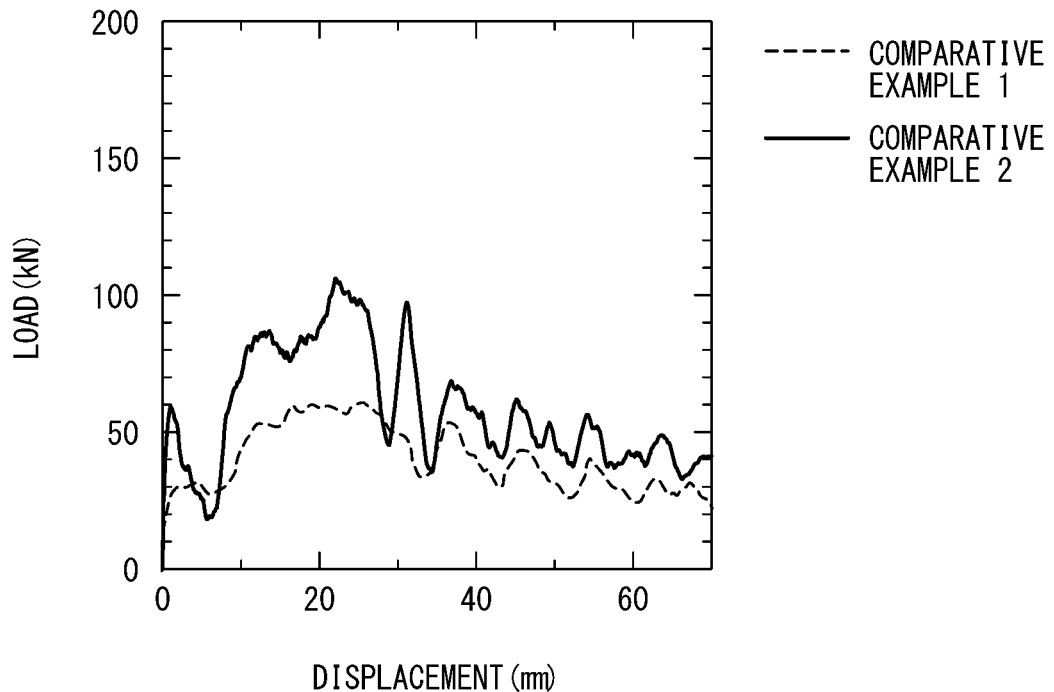
FIG. 9 is a diagram showing a relationship between displacement and a load in a collision direction Y of Comparative Example 1 and Comparative Example 2.
Figure 10:
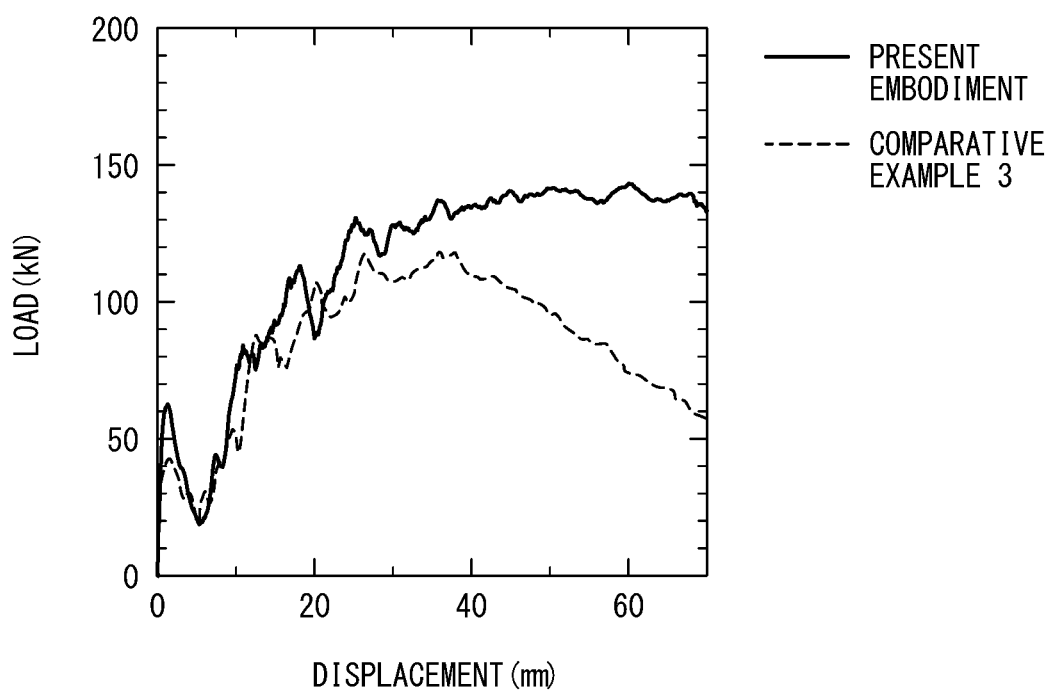
FIG. 10 is a comparative diagram showing a relationship between displacement and a load in the collision direction Y of the present embodiment and Comparative Example 3.

FIG. 7 is a comparative diagram showing cross-sectional deformations of Comparative Example 1 and Comparative Example 2. FIG. 8 is a comparative diagram, showing cross-sectional deformations of the present embodiment and Comparative Example 3. FIG. 9 is a diagram showing a relationship between displacement (an amount of penetration) and a load in the collision direction Y in Comparative Example 1 and Comparative Example 2. FIG. 10 is a comparative diagram showing a relationship between displacement (an amount of penetration) and a load in the collision direction Y in the present embodiment and Comparative Example 3.

FIG. 7 shows a cross-section of Comparative Example 1 on a left side thereof and a cross-section of Comparative Example 2 on a right side thereof. FIG. 8 shows a cross-section of Comparative Example 3 on a left side thereof and a cross-section of the present embodiment on a right side thereof. FIGS. 7 and 8 show cross-sectional shapes at each stage when a load gradually increases from top to bottom.

As shown in FIG. 7, in a case in which a cross-sectional shape of the first member 110 is linear, as compared with Comparative Example 1 having no stiffening member 200, Comparative Example 2 having the stiffening member 200 relatively inhibits deformation in the collision direction Y even when the load increases. On the other hand, in both Comparative Example 1 and Comparative Example 2, the vertical walls 122 are greatly tilted as the load increases. Further, in Comparative Example 2, at the time when the load is relatively small, an end portion of the stiffening member 200 that supports the first member 110 is buckled and deformed.

In addition, as shown in FIG. 9, the displacement of Comparative Example 2 becomes larger than that of Comparative Example 1 while maintaining a relatively large load. However, both Comparative Example 1 and Comparative Example 2 have a relatively small amount of energy absorption because the displacement proceeds without maintaining a large load.

As shown in FIG. 8, in a case in which the cross-sectional shape of the first member 110 has the protruding portion 113 and the recessed portions 114, even in Comparative Example 3 having no stiffening member 200, the recessed portions 114 resist, and thus as compared with Comparative Example 1 and Comparative Example 2, deformation of the vertical walls 122 (tilt of the vertical walls 122) in the height direction Z is inhibited. On the other hand, in Comparative Example 3, when the recessed portions 114 deform as the load increases, the effect of inhibiting the deformation of the vertical walls 122 diminishes, and thus the load further increases, the deformation of the vertical walls 122 becomes larger, and the cross-sectional, dimension in the collision, direction Y is decreased.

On the other hand, in the present embodiment, even if the load increases, the stiffening member 200 supports the recessed portions 114 to maintain cross-sectional shapes of the recessed portions 114, and thus the deformation of the vertical walls 122 is also inhibited. As a result, as compared with Comparative Example 3 having no stiffening member 200, the present embodiment having the stiffening member 200 relatively inhibits deformation in the collision direction Y even when the load increases.

In addition, as shown in FIG. 10, in both Comparative Example 3 and the present embodiment, the displacement progresses while maintaining a relatively large load. However, in Comparative Example 3, the load decreases as the displacement progresses. In addition, in contrast thereto, in the present embodiment, since a large load can be maintained as compared with Comparative Example 3 even at a stage at which the displacement is small, and a large load is maintained even when the displacement, progresses, it has a large amount of energy absorption.

That is, according to the automotive structural member 1 of the present embodiment, even if the applied load increases, the deformation in the height direction Z (tilt of the vertical walls 122) and the deformation in the collision direction Y can be inhibited, and the cross-sectional shape can be maintained. Accordingly, a large amount of impact energy can be absorbed with a small amount of penetration.

Other Embodiments

Although the above embodiment has been described in detail with reference to the drawings, the specific configuration is not limited to the above, and various changes in design can be made.

The automotive structural member 1 of the present embodiment is an elongated and hollow automotive structural member 1 including a portion extending along the linear axis X, which includes the first member 110 extending in the axis X direction of the automotive structural member 1, the second member 120 that extends in the axis X direction and is connected to the first member 110 to form a closed cross-section together with the first member 110, and the stiffening member 200 disposed between the first member 110 and the second member 120. The first member 110 has the flange portion (first member flange portion 111), the first member ridgeline portion 112 connected to the flange portion (first member flange portion 111), the protruding portion 113 having the top surface 113a which is connected to the first member ridgeline portion 112 and is aligned with the top surface 111a of the flange portion (first member flange portion 111) at the same level L, and the recessed portion 114 adjacent to the protruding portion 113. The second member 120 has the second member ridgeline portion 121 having the upper surface 121a in contact with the lower surface 112b along the lower surface 112b of the first member ridgeline portion 112, and the vertical wall 122 connected to the second member ridgeline portion 121, and the bottom wall 123 connected to the vertical wall 122. The stiffening member 200 supports the recessed portion 114. According to the automotive structural member 1 of the present embodiment, when a load such as an impact acts from the front side to the rear side in the collision direction Y, the first member ridgeline portion 112 and the second member ridgeline portion 121, which overlap each other and whose surfaces are in contact with each other, resist deformation with high rigidity, and the stiffening member 200 inhibits the deformation of the recessed portion 114 that inhibits the deformation of the vertical wall 122 toward the axis X. Accordingly, the automotive structural member 1 can absorb a large amount of impact energy with a small amount of penetration.

INDUSTRIAL APPLICABILITY

According to the present invention, it is possible to provide an automotive structural member that can absorb a large amount of impact energy with a small amount of penetration.

BRIEF DESCRIPTION OF THE REFERENCE SYMBOLS

1 Automotive structural member
110 First member
111 First member flange portion (flange portion)
111a Top surface
112 First member ridgeline portion
112b Lower surface
113 Protruding portion
113a Top surface
113c Top portion
113d Protruding portion curved portion
114 Recessed portion
114c Bottom portion
114d First recessed portion curved portion
114e Second recessed portion curved portion
120 Second member
121 Second member ridgeline portion
121a Upper surface
122 Vertical wall
123 Bottom wall
124 Second member flange portion
125 Corner portion
200 Stiffening member
210 First stiffening member
220 Second stiffening member
230 Base member
250 Notch portion
k Deviating distance
L Level
m Center
S Surface
X Axis
Y Collision direction
Z Height direction

The invention claimed is:

1. An elongated and hollow automotive structural member including a portion extending along a linear axis, comprising:
  a first member extending in the axial direction of the automotive structural member;
  a second member that extends in the axial direction and is connected to the first member to form a closed cross-section together with the first member; and
  a stiffening member disposed between the first member and the second member,
  wherein the first member includes a flange portion, a first member ridgeline portion connected to the flange portion, a protruding portion including a top surface that is connected to the first member ridgeline portion and aligned with a top surface of the flange portion at the same level, and a recessed portion adjacent to the protruding portion, the second member includes a second member ridgeline portion that has an upper surface in contact with a lower surface of the first member ridgeline portion along the lower surface, a vertical wall connected to the second member ridgeline portion, and a bottom wall connected to the vertical wall, and the stiffening member supports the recessed portion.

2. The automotive structural member according to claim 1, wherein the stiffening member is connected to or disposed close to the bottom wall.

3. The automotive structural member according to claim 1, wherein the stiffening member is disposed along the axis and disposed at a position deviated from a center of the recessed portion toward the axis side.

4. The automotive structural member according to claim 1, wherein the stiffening member has a wave shape along the axis.

5. The automotive structural member according to claim 1, wherein the stiffening member has notch portions formed intermittently along the axis.

6. The automotive structural member according to claim 1, wherein the stiffening member includes a first stiffening member and a second stiffening member in parallel and is connected to the bottom wall via a plate-shaped base member that fixes the first stiffening member and the second stiffening member.

7. The automotive structural member according to claim 6, wherein the first stiffening member and the second stiffening member are separated from each other at a central portion in the axial direction.

8. The automotive structural member according to claim 6, wherein the first stiffening member and the second stiffening member are joined in a state in which they are in contact with each other at end portions thereof in the axial direction.

9. The automotive structural member according to claim 1, wherein the second member is attached to a vehicle body.

* * * * *